United States Patent
Childs et al.

(10) Patent No.: US 8,165,177 B2
(45) Date of Patent: Apr. 24, 2012

(54) SYSTEM AND METHOD FOR HYBRID VIRTUAL MACHINE MONITOR FILE SYSTEM OPERATIONS

(75) Inventors: Philip Lee Childs, Raleigh, NC (US); Mark Charles Davis, Durham, NC (US); Ke Ke, Beijing (CN); Rod David Waltermann, Rougemont, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1487 days.

(21) Appl. No.: 11/615,289

(22) Filed: Dec. 22, 2006

(65) Prior Publication Data
US 2008/0154985 A1    Jun. 26, 2008

(51) Int. Cl.
*G06F 7/00* (2006.01)
*G06F 12/00* (2006.01)

(52) U.S. Cl. ........ 370/546; 719/312; 719/313; 719/319; 707/609; 707/651; 707/652; 707/821; 707/822

(58) Field of Classification Search ............... 370/546, 370/392; 719/312, 313, 319; 707/609, 651, 707/652, 653, 654, 692, 821, 822, 827, 899
See application file for complete search history.

(56) References Cited

U.S. PATENT DOCUMENTS

| | | | | |
|---|---|---|---|---|
| 6,269,409 B1 * | 7/2001 | Solomon | ........................ | 719/329 |
| 6,601,146 B2 * | 7/2003 | Auslander et al. | ............. | 711/147 |
| 6,725,284 B2 * | 4/2004 | Arndt | ................. | 710/5 |
| 7,360,030 B1 * | 4/2008 | Georgiev | ....................... | 711/141 |
| 2005/0268298 A1 * | 12/2005 | Hunt et al. | ........................ | 718/1 |
| 2006/0149899 A1 * | 7/2006 | Zimmer et al. | ................ | 711/112 |
| 2006/0253682 A1 * | 11/2006 | Armstrong et al. | ............ | 711/173 |
| 2008/0005297 A1 * | 1/2008 | Kjos et al. | ...................... | 709/223 |

* cited by examiner

*Primary Examiner* — Dang Ton
*Assistant Examiner* — Robert M Morlan
(74) *Attorney, Agent, or Firm* — Ference & Associates LLC

(57) ABSTRACT

A system and method for hybrid virtual machine monitor system is provided. A first operating system uses a file system to manage data storage and retrieval within a data storage area. A second operating system, which is not compatible with the first operating system's file system, executes a management application backup utility. The first operating system includes a filter driver that sends logical block addresses, which correspond to data reads/writes, to the management application backup utility. In turn, the management application backup utility uses the logical block addresses to perform operations on the data storage locations. In one embodiment, the management application backup utility performs actions on the data storage area, such as a disk defragmentation, and subsequently sends data location changes to the filter driver. In this embodiment, the filter driver instructs the first operating system's file system to update its translation tables based upon the data location changes.

17 Claims, 6 Drawing Sheets

SYSTEM AND METHOD FOR HYBRID VIRTUAL MACHINE MONITOR FILE SYSTEM OPERATIONS

BACKGROUND OF THE INVENTION

1. Technical Field

The present invention relates to a system and method for hybrid virtual machine monitor file system operations. More particularly, the present invention relates to a system and method that allows applications executing on a separate operating system to perform operations on data that is managed by a file system, which is incompatible with the separate operating system.

2. Description of the Related Art

A computer's operating system uses a file system to read and write data from and to data storage areas. The file system receives file names from applications executing on the operating system and translates the file names to logical block addresses in order to read/write data from/to the correct data storage locations within the data storage area. The data storage area device stores data in blocks that are commonly 512 characters in size, and operations are performed on complete blocks.

In a business environment, a business may wish to use a separate computer system to perform data back up and restore operations. For example, a business may wish to configure a network to include twenty client computers that read from and write to a main storage area, and a separate computer that includes a utility program for backing up the main storage area in the evening. Another example is that each personal computer may use a hypervisor to run two operating systems. In this example, one operating system may create and use an NTFS (NT File System) file system, and the second operating system may provide data management services, such as a back up. A challenge found with existing art is that this configuration is not feasible unless the file systems used by the client computers are designed to support distributed operations. NTFS, which is the most common file system used in a Windows operating system, does not support distributed operations. This is due to the fact that, although multiple access to a data storage area is common, only one operating system executes the NTFS code. As a result, only that particular operating system is able to understand the file system status.

Another challenge found is when an operating system executing a backup utility program is incompatible with a file system that reads from and writes to the data storage area. For example, a client computer may run a Windows operating system, which uses an NTFS file system. In this example, if a backup computer system uses Linux to execute utility programs, the utility programs are not able to perform a robust data backup or recovery because Linux is not fully compatible with NTFS.

What is needed, therefore, is a system and method that allows applications executing on a separate operating system to perform operations on data that is managed by a file system, which is incompatible with the separate operating system.

SUMMARY

It has been discovered that the aforementioned challenges are resolved using a system and method to use a filter driver located within a file system to provide logical block addresses to a management application backup utility that, in turn, uses the logical block addresses to perform operations on data storage locations included in a data storage area accessed by the file system. A first operating system uses a file system to manage data storage and retrieval within a data storage area. A second operating system, which is not compatible with the first operating system's file system, executes a management application, such as a backup utility. By receiving logical block addresses from the filter driver, the management application backup utility is able to perform data backup actions on data storage locations included in the data storage area.

An application executes within a first operating system and sends a data request to the first operating system's file system to perform particular actions, such as reading data from or writing data to a data storage location included in the data storage area. The first operating system's file system receives the data request and translates a file name included in the data request to a logical block address using a translation table. In turn, the first operating system's file system sends and receives disk block data to/from the data storage area through a hypervisor, which isolates the first operating system from other operating systems and allows each operating system to execute independently.

While the first operating system's file system reads/writes data from/to the data storage area, a filter driver located in the file system detects the logical block addresses and sends them to a management application backup utility executing within a second operating system, which is incompatible with the first operating system's file system. In turn, the management application backup utility uses the logical block addresses to perform actions on data storage locations within the data storage area through the hypervisor.

In one embodiment, the management application backup utility may backup data at different data storage locations included in the data storage area. In another embodiment, the management application backup utility may back up data to a different storage device altogether, such as an alternative storage area.

In yet another embodiment, the management application backup utility may perform an action on the data storage area, such as a disk defragmentation, and subsequently send data location changes to the filter driver. In this embodiment, the filter driver instructs the first operating system's file system to update its translation tables based upon the received data location changes.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
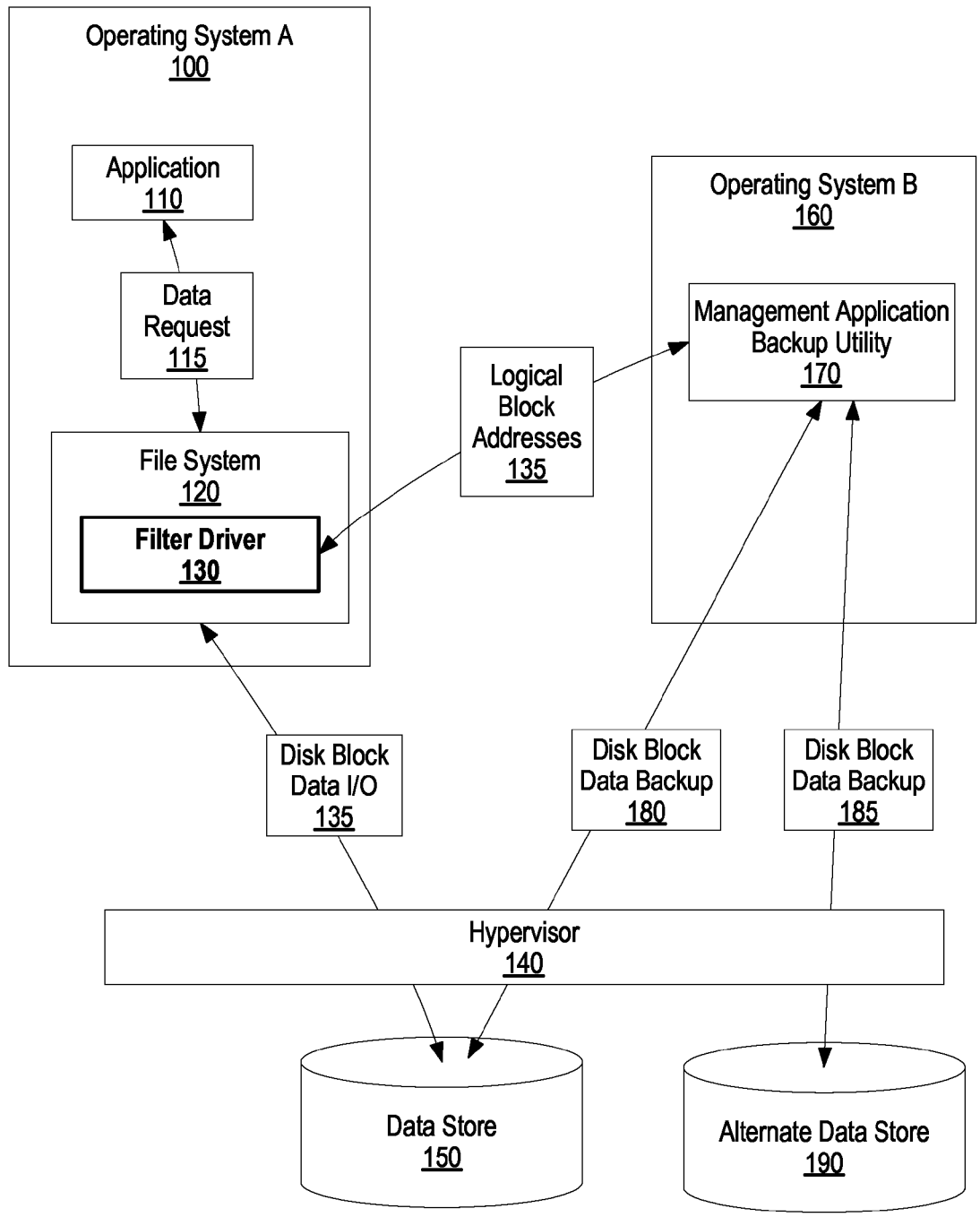
FIG. 1 is a diagram showing a first operating system modifying data stored in a storage area and a second operating system backing up the modified data.

FIG. 1 is a diagram showing a first operating system modifying data stored in a storage area and a second operating system backing up the modified data. Operating system A 100 uses file system 120 to manage data storage and retrieval within data store 150. Operating system B 160 is not compatible with file system 120 yet, by receiving logical block addresses 155 from filter driver 130, management application backup utility 170 is able to perform data backup actions on data storage locations included in data store 150. Data store 150 may be stored on a nonvolatile storage area, such as a computer hard drive.

Application 110 executes within operating system A 100, and sends data requests (data request 115) to file system 120 to perform particular actions, such as reading data from and writing data to a data storage location included in data store 150. For example, application 110 may be a data base application that updates customer profiles stored in data store 150.

File system 120 receives data request 110 and translates a file name included in data request 115 to a logical block address (i.e. physical address) using a translation table. In turn, file system 120 sends and receives disk block data I/O 135 to/from data store 150 through hypervisor 140, which isolates operating system A 100 from operating system B 160 and allows the two operating systems to execute independently.

While file system 120 reads/writes data from/to data store 150, filter driver 130 detects the logical block addresses and sends them (logical block addresses 135) to management application backup utility 170 located within operating system B 160, which is incompatible with file system 120. For example, operating system A 100 may be a Windows operating system, file system 120 may be a NTFS file system, and operating system B 160 may be a Linux operating system. In turn, management application backup utility 170 is able to perform actions on data storage locations within data store 150 through hypervisor 140 using logical block addresses 135.

In one embodiment, management application backup utility 170 may backup data (disk block data backup 180) at different data storage locations included in data store 150. In another embodiment, management application backup utility 170 may back up data (disk block data backup 185) to a different storage device altogether, such as alternative data store 190. Alternative data store 190 may be stored on a nonvolatile storage area, such as a computer hard drive.

In another embodiment, management application backup utility 170 may perform an action on data store 150, such as a defragmentation, and subsequently send data location changes to filter driver 130. In this embodiment, filter driver 130 instructs file system 120 to update its translation tables based upon the data location changes resulting from management application backup utility 170's actions (see FIG. 5 and corresponding text for further details).

Figure 2:
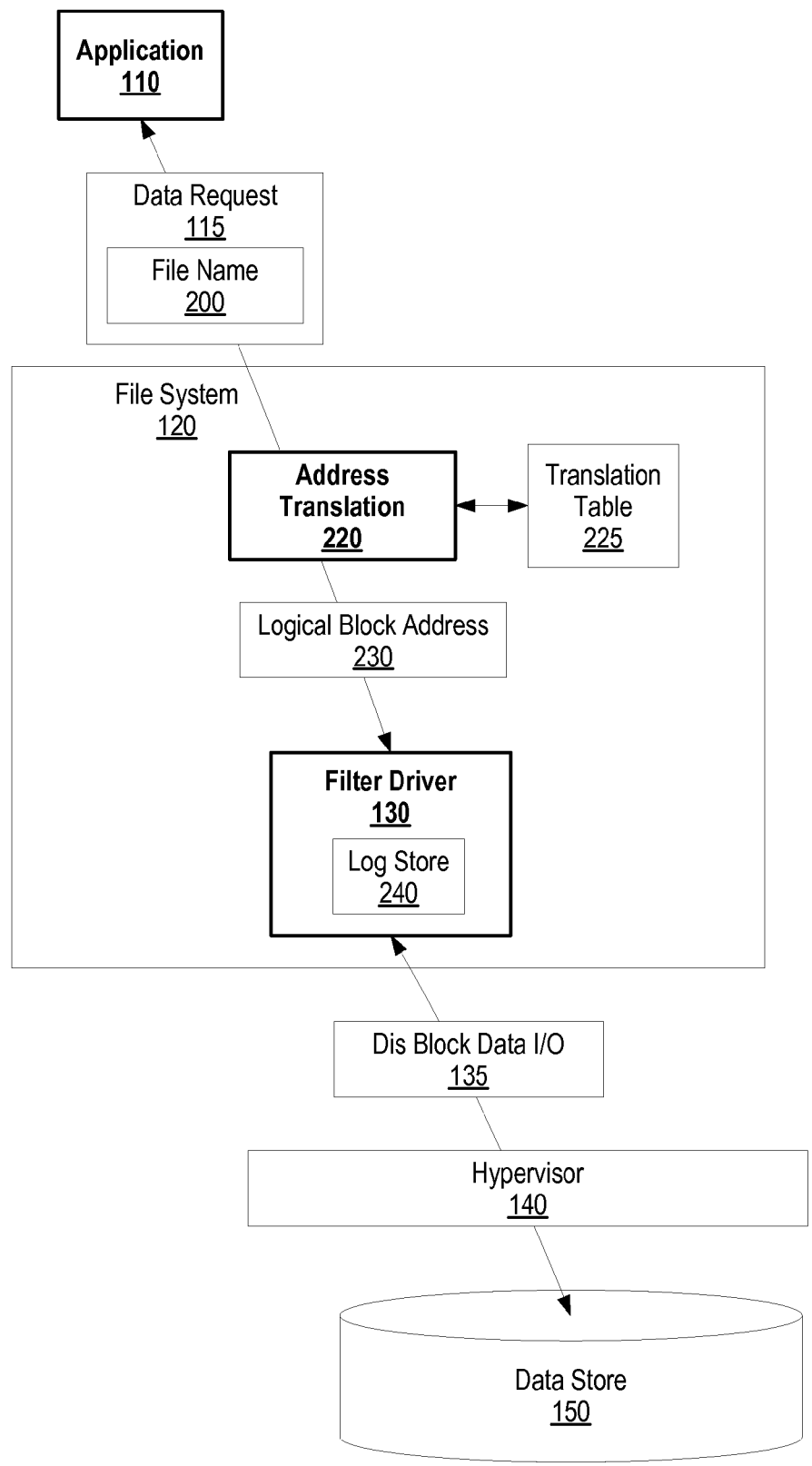
FIG. 2 is a diagram showing a file system translating a file name received from an application to a logical block address and the file system's filter driver logging the logical block address for later transmission to a management application backup utility located within an operating system that is incompatible with the file system.

FIG. 2 is a diagram showing a file system translating a file name received from an application to a logical block address and the file system's filter driver logging the logical block address for later transmission to a management application backup utility located within an operating system that is incompatible with the file system.

Application 110 sends data request 115, which includes file name 200, to file system 120. For example, data request 115 may be a request to modify data corresponding to file name 200. File system 120 receives data request 115, and performs address translation 220 on file name 200 using translation table 225, which results in logical block address 230. For example, file name 200 may be "C:file.txt" and, in this example, address translation 220 translates "C:file.txt" into "LBA 2-5, 9, 11 and 270001." File system 120 also tracks which logical block addresses are available in order to determine where to store new files or manage a file's size increasing. Application 110, data request 115, and file system 120 are the same as that shown in FIG. 1.

Filter driver 130 detects logical block address 230 and stores it in log store 240 for later transmission to a management application backup utility. In one embodiment, instead of storing logical block address 230, filter driver 130 may immediately send logical block address 230 to the management application backup utility (see FIG. 3B and corresponding text for further details). Filter driver 130 is the same as that shown in FIG. 1.

File system 120 reads/writes disk block data I/O 135 from/to a data storage location in data store 150 corresponding to logical block address 230 through hypervisor 140. Hypervisor 140 allows a second operating system to access data store 150 in isolation from file system 120, such as backing up recently modified data. Disk block data I/O 135, hypervisor 140, and data store 150 are the same as that shown in FIG. 1.

Figure 3A:
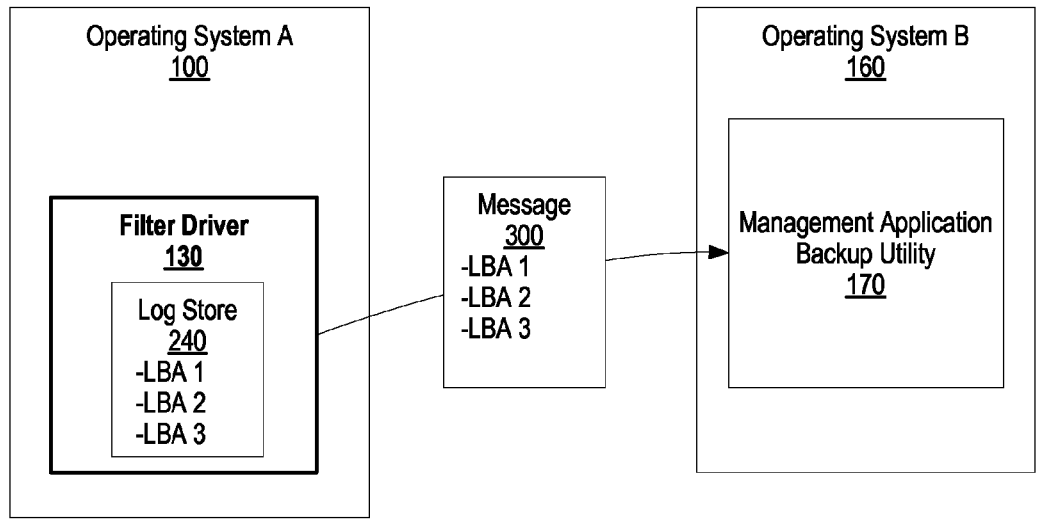
FIG. 3A is a diagram showing a file system's filter driver storing logical block addresses and sending the logical block addresses to a second operating system in a message.

FIG. 3A is a diagram showing a file system's filter driver storing logical block addresses and sending the logical block addresses to a second operating system in a message. Filter driver 130 is located within operating system A 100, and logs logical block addresses in log store 240 that correspond to an application's data requests. Periodically, such as on an hourly basis, filter driver 130 sends the logged logical block addresses via message 300 to management application backup utility 170, which is located in operating system B 160. Operating system A 100, filter driver 130, operating system B 160, and management application backup utility 170 are the same as that shown in FIG. 1. Log store 240 is the same as that shown in FIG. 2.

The embodiment shown in FIG. 3A may be used to minimize cross-domain communication between operating system A 100 and operating system B 160. In this embodiment, filter driver 130 may compare new logical block addresses with stored logical block addresses in order to avoid duplicate addresses in log store 240.

Figure 3B:
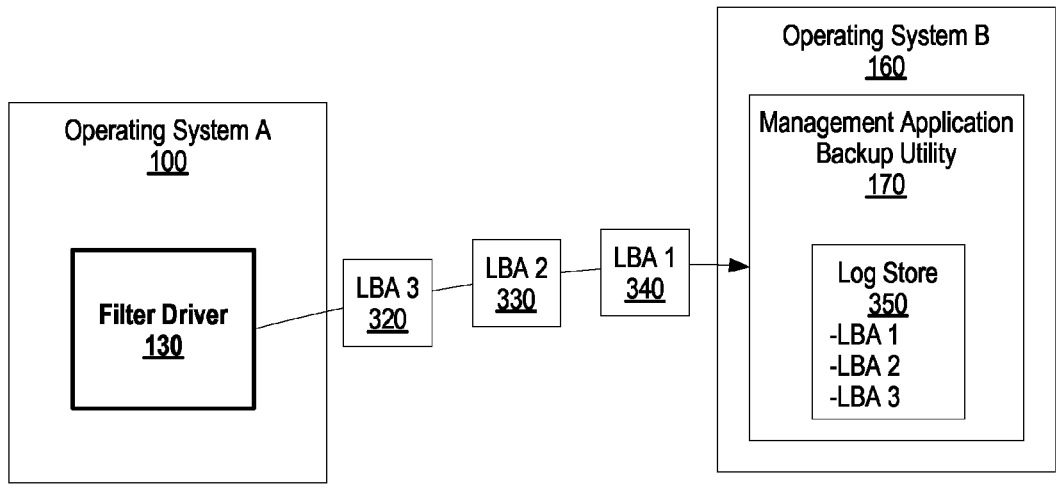
FIG. 3B is a diagram showing a file system's filter driver sending logical block addresses to a management application backup utility as the filter driver detects the logical block addresses.

FIG. 3B is a diagram showing a file system's filter driver sending logical block addresses to a management application backup utility as the filter driver detects the logical block addresses. Unlike the example shown in FIG. 3A, filter driver 130 (located in operating system A 100) sends a logical block address to management application backup utility 170 (located in operating system B 160) as soon as filter driver 130 detects a logical block address. Operating system A 100, filter driver 130, operating system B 160, and management application backup utility 170 are the same as that shown in FIG. 1.

The embodiment shown in FIG. 3B shows that filter driver sends logical block addresses 320-340 in separate transmissions to management application backup utility 170. As such, management application backup utility 170 stores the logical block addresses in log store 350. In this embodiment, management application backup utility 170 may analyze the logical block addresses stored in log store 350 in order to remove duplicate addresses prior to performing actions.

Figure 4:
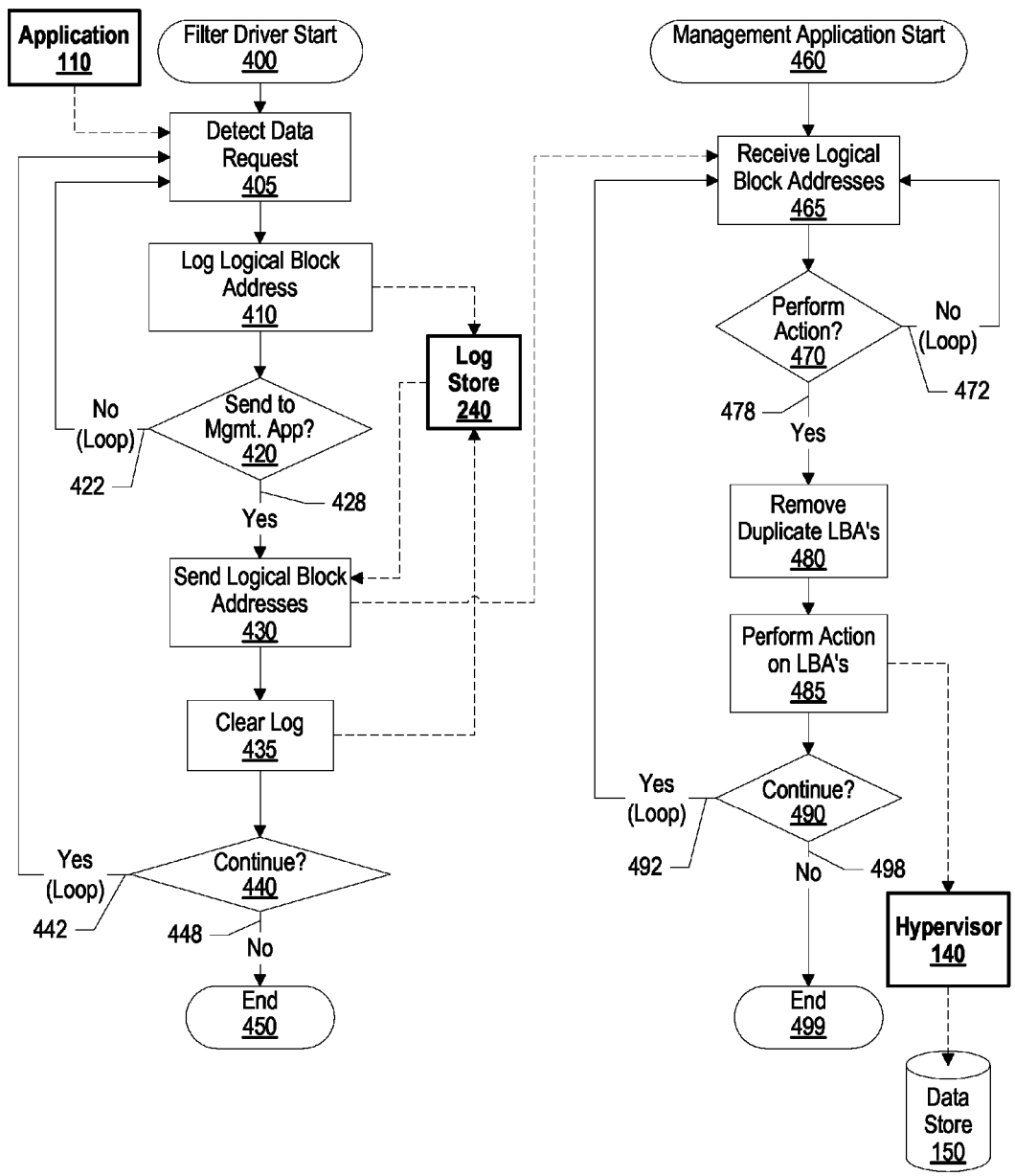
FIG. 4 is a flowchart showing steps taken in a filter driver sending logical block addresses to a management application backup utility, which performs actions on data storage locations corresponding to the logical block addresses.

FIG. 4 is a flowchart showing steps taken in a filter driver sending logical block addresses to a management application backup utility, which performs actions on data storage locations corresponding to the logical block addresses.

Filter driver processing commences at 400, whereupon the filter driver detects a data request from application 110 at step 405. Application 110's data request includes a file name that the file system translates to a logical block address. At step 410, the filter driver logs the logical block address in log store 240, which is the same as that shown in FIG. 2. In one embodiment, the filter driver logs the logical block address only when the data request corresponds to modifying data corresponding to the logical block address, such as with write requests. Depending upon the management application, action may not be required for all operations. For example, if the management application is a backup application, then for non-data modifying requests, such as read requests, the filter driver may not log the logical block address because changes are not made to the data. For some management applications all operations must be logged. Application 110 is the same as that shown in FIG. 1.

In another embodiment, the filter driver may analyze logical block addresses already included in log store 240 to determine whether the newly acquired logical block address is a duplicate of a previously stored logical block address. In this embodiment, the filter driver may not log the newly acquired logical block address in order to avoid duplication.

A determination is made as to whether to send the logical block address to the management application (decision 420). For example, the filter driver may periodically send a message to the management application backup utility that includes the logical block addresses that have been logged in log store 240, such as once an hour (see FIG. 3A and corresponding text for further details). In another example, the filter driver sends a logical block address to the management application backup utility as soon as the filter driver detects the logical block addresses (see FIG. 3B and corresponding text for further details).

If the filter driver should not send logical block addresses to the management application backup utility, decision 420 branches to "No" branch 422, which loops back to process more data requests received from application 110. This looping continues until the filter driver should send the logical block addresses to the management application backup utility, at which point decision 420 branches to "Yes" branch 428 whereupon the filter driver sends the logical block addresses stored in log store 240 to the management application (step 430).

At step 435, the filter driver clears log store 240, and a determination is made as to whether to continue processing (decision 440). If filter driver processing should continue, decision 440 branches to "Yes" branch 442, which loops back to continue to process data requests from application 110. This looping continues until filter driver processing should terminate, at which point decision 440 branches to "No" branch 448 whereupon filter driver processing ends at 450.

Management application backup utility processing commences at 460, whereupon the management application backup utility receives logical block addresses from the filter driver at step 465. A determination is made as to whether to perform an action on data storage locations corresponding to the received logical block addresses (decision 470). For example, the management application backup utility may store the received logical block addresses received during the day, and perform a backup on each of the logical block addresses at night.

If processing should wait to perform an action on data storage locations corresponding to the received logical block addresses, decision 470 branches to "No" branch 472, which loops back to receive more logical block addresses from the filter driver. This looping continues until the management application backup utility should perform an action on data storage locations corresponding to received logical block addresses, at which point decision 470 branches to "Yes" branch 478.

At step 480, the management application backup utility removes duplicate logical block addresses if the filter driver has not already performed an address duplication step. For example, if the filter driver sends logical block addresses to the management application backup utility as soon as the filter driver detects them, the filter driver does not know whether duplicate logical block addresses exist. In one embodiment, when the filter driver periodically sends a group of logical block addresses to the management application backup utility, the filter driver analyses the stored logical block addresses before storing a newly received logical block address in order to ensure no duplications. In this embodiment, the management application backup utility may not perform step 480.

At step 485, management application backup utility processing performs actions on data storage locations corresponding to the logical block addresses. The management application backup utility performs the actions through hypervisor 140 on data storage locations that are located in data store 150. In one embodiment, the management application backup utility may also store data in an alternate storage area (see FIG. 1 and corresponding text for further details). Hypervisor 140 and data store 150 are the same as that shown in FIG. 1.

A determination is made as to whether to continue management application backup utility processing (decision 490). If processing should continue, decision 490 branches to "Yes" branch 492, which loops back to receive and process more logical block addresses. This looping continues until processing should terminate, at which point decision 490 branches to "No" branch 498, whereupon management application backup utility processing ends at 499.

Figure 5:
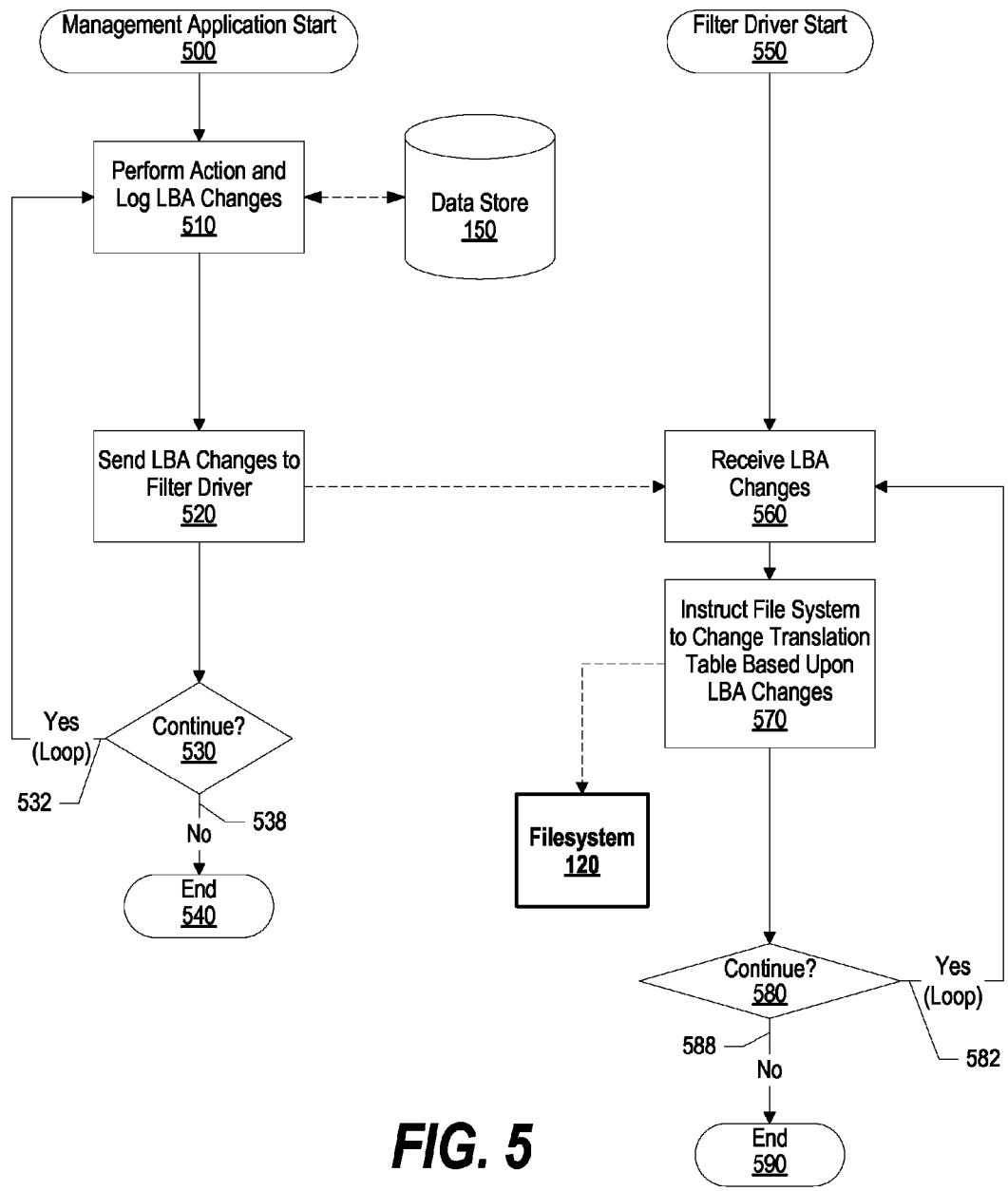
FIG. 5 is a flowchart showing steps taken in a management application performing actions on data storage locations and sending logical block address changes to a filter driver that, in turn, instructs a file system to update its translation table accordingly.

FIG. 5 is a flowchart showing steps taken in a management application performing actions on data storage locations and sending logical block address changes to a filter driver that, in turn, instructs a file system to update its translation table accordingly.

Management application processing commences at 500, whereupon the management application performs actions, such as a defragmentation, on data storage locations located in data store 150. The data storage locations are managed by a file system that is incompatible with the management application backup utility. While performing the actions, the management application logs data address changes that result from the action (step 510). For example, while defragmenting data store 150, data may move from one logical block to a different logical block in order to defragment a particular file. Data store is the same as that shown in FIG. 1. At step 520, the management application sends the logical block address changes to a filter driver located within the file system.

A determination is made as to whether to continue management application processing (decision 530). If processing should continue, decision 530 branches to "Yes" branch 532, which loops back to continue to process actions performed on data store 150. This looping continues until management application processing should terminate, at which point decision 530 branches to "No" branch 538 whereupon processing ends at 540.

Filter driver processing commences at 550, whereupon the filter driver receives the logical block address changes from the management application at step 560. At step 570, the filter driver instructs file system 120 to modify its translation table based upon the logical block address changes. For example, the file system may include an application program interface (API) that allows the filter driver to communicate with the file system and instruct the file system to modify its translation table. File system 120 is the same as that shown in FIG. 1.

A determination is made as to whether to continue filter driver processing (decision 580). If processing should continue, decision 580 branches to "Yes" branch 582, which loops back to continue to process logical block address changes. This looping continues until filter driver processing should terminate, at which point decision 580 branches to "No" branch 588 whereupon processing ends at 590.

Figure 6:
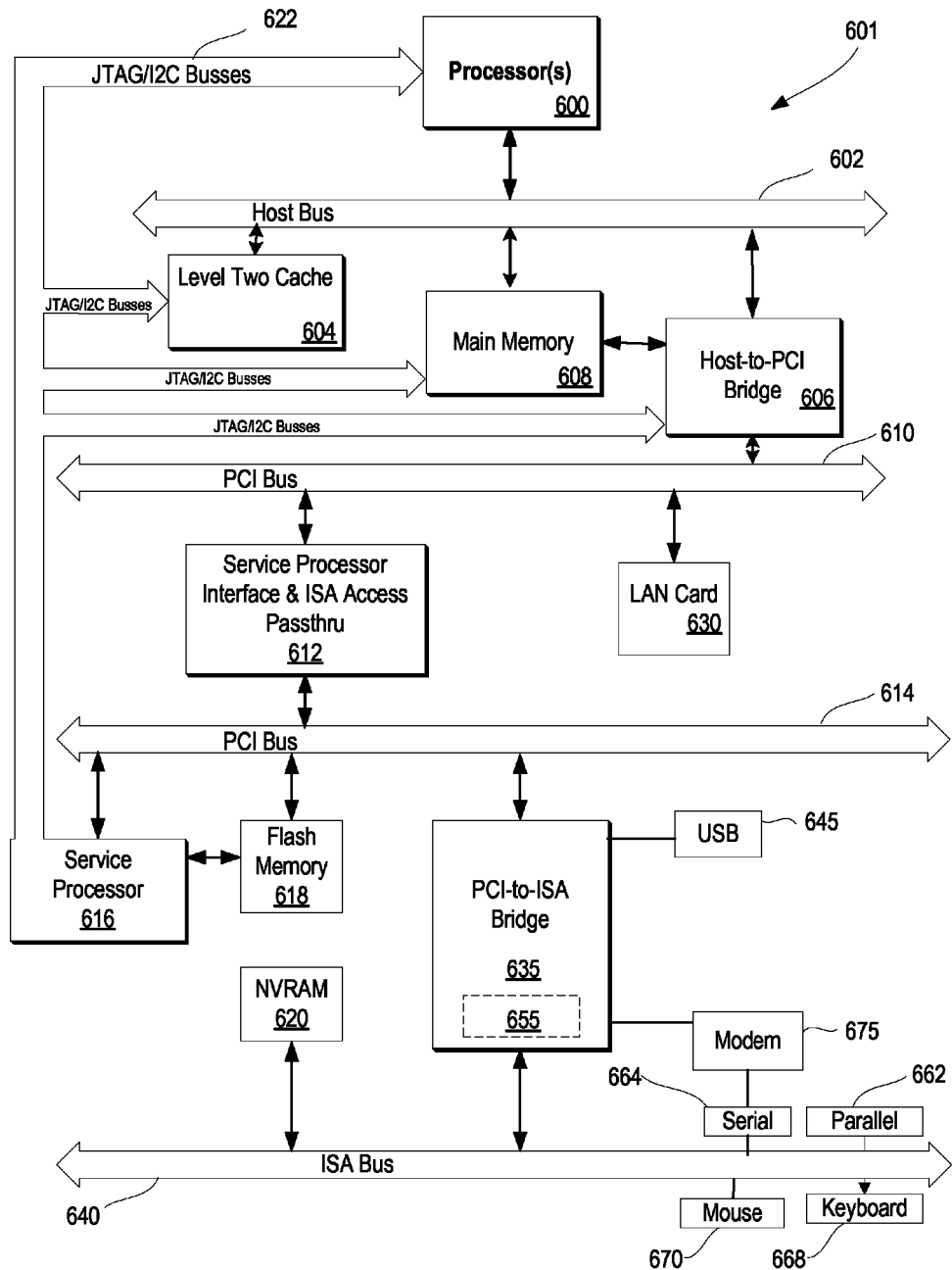
FIG. 6 is a block diagram of a computing device capable of implementing the present invention.

FIG. 6 illustrates information handling system 601 which is a simplified example of a computer system capable of performing the computing operations described herein. Computer system 601 includes processor 600 which is coupled to host bus 602. A level two (L2) cache memory 604 is also coupled to host bus 602. Host-to-PCI bridge 606 is coupled to main memory 608, includes cache memory and main memory control functions, and provides bus control to handle transfers among PCI bus 610, processor 600, L2 cache 604, main memory 608, and host bus 602. Main memory 608 is coupled to Host-to-PCI bridge 606 as well as host bus 602. Devices used solely by host processor(s) 600, such as LAN card 630, are coupled to PCI bus 610. Service Processor Interface and ISA Access Pass-through 612 provides an interface between PCI bus 610 and PCI bus 614. In this manner, PCI bus 614 is insulated from PCI bus 610. Devices, such as flash memory 618, are coupled to PCI bus 614. In one implementation, flash memory 618 includes BIOS code that incorporates the necessary processor executable code for a variety of low-level system functions and system boot functions.

PCI bus 614 provides an interface for a variety of devices that are shared by host processor(s) 600 and Service Processor 616 including, for example, flash memory 618. PCI-to-ISA bridge 635 provides bus control to handle transfers between PCI bus 614 and ISA bus 640, universal serial bus (USB) functionality 645, power management functionality 655, and can include other functional elements not shown, such as a real-time clock (RTC), DMA control, interrupt support, and system management bus support. Nonvolatile RAM 620 is attached to ISA Bus 640. Service Processor 616 includes JTAG and I2C busses 622 for communication with processor(s) 600 during initialization steps. JTAG/I2C busses 622 are also coupled to L2 cache 604, Host-to-PCI bridge 606, and main memory 608 providing a communications path between the processor, the Service Processor, the L2 cache, the Host-to-PCI bridge, and the main memory. Service Processor 616 also has access to system power resources for powering down information handling device 601.

Peripheral devices and input/output (I/O) devices can be attached to various interfaces (e.g., parallel interface 662, serial interface 664, keyboard interface 668, and mouse interface 670 coupled to ISA bus 640. Alternatively, many I/O devices can be accommodated by a super I/O controller (not shown) attached to ISA bus 640.

In order to attach computer system 601 to another computer system to copy files over a network, LAN card 630 is coupled to PCI bus 610. Similarly, to connect computer system 601 to an ISP to connect to the Internet using a telephone line connection, modem 665 is connected to serial port 664 and PCI-to-ISA Bridge 635.

While FIG. 6 shows one information handling system that employs processor(s) 600, the information handling system may take many forms. For example, information handling system 601 may take the form of a desktop, server, portable, laptop, notebook, or other form factor computer or data processing system. Information handling system 601 may also take other form factors such as a personal digital assistant (PDA), a gaming device, ATM machine, a portable telephone device, a communication device or other devices that include a processor and memory.

One of the preferred implementations of the invention is a client application, namely, a set of instructions (program code) in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
receiving one or more data requests at a file system from an application, the application and the file system executing on a first operating system that executes on a processor;
determining, by the processor, one or more logical block addresses that correspond to the one or more data requests, the one or more logical block addresses identifying one or more data storage location locations within a first data storage area;
sending the one or more logical block address addresses to a second operating system via a filter driver located on the first operating system, the second operating system incompatible with the file system; and
at the second operating system, performing an action one or more actions on the one or more data storage locations that correspond to the one or more logical block addresses received from the first operating system,
isolating the first operating system from the second operating system using a hypervisor, the hypervisor providing cross-domain communication capability to send the one or more, logical block addresses from the filter driver located on the first operating system to a management application backup utility located on the second operating system; and
providing the first operating system and the second operating system access to the data storage device through the hypervisor.

2. The method of claim 1 wherein the one or more data requests results in the first operating system modifying data included in the one or more data storage locations, the method further comprising:
at the second operating system, storing the modified data in a second storage area that is different than the first storage area.

3. The method of claim 1, further comprising:
receiving a plurality of data requests from the application;
determining a plurality of logical block addresses, each of the plurality of logical block addresses corresponding to one of the plurality of data requests;
after determining the plurality of logical block addresses, sending the plurality of logical block addresses to the second operating system in a message;
removing, at the second operating system, duplicate logical block addresses included in the plurality of logical block addresses, the removing resulting in a plurality of remaining logical block addresses; and
at the second operating system, performing one of the actions using each of the plurality of remaining logical block addresses.

4. The method of claim 1 further comprising:
defragmenting the first data storage area using the second operating system; and
in response to the defragmenting, sending logical block address changes from the second operating system to the first operating system, the logical block address changes identifying data location changes within the first data storage area resulting from the defragmenting.

5. The method of claim 4 further comprising:
updating, at the first operating system, the file system based upon the logical block address changes received from the second operating system that resulted from the defragmenting.

6. The method of claim 1, wherein the second operating system is located on a different computer system than the first operating system.

7. A computer program product stored on a computer operable non-transitory storage medium, the computer operable storage medium containing instructions for execution by a computer, which, when executed by the computer, cause the computer to implement a method for hybrid virtual machine monitor file system operations, the method comprising:
receiving one or more data requests at a file system from an application, the application and the file system executing on a first operating system;
determining one or more logical block addresses that correspond to the one or more data requests, the one or more logical block addresses identifying one or more data storage locations within a first data storage area;
sending the one or more logical block addresses identifying one or more data storage locations within a first data storage area;
sending the one or more logical block addresses to a second operating system via a filter driver located on the first operating system, the second operating system incompatible with the f-ties file system; and
at the second operating system, performing one or more actions on the one or more data storage locations that correspond to the one or more logical block addresses received from the first operating system,
isolating the first operating system from the second operating system using a hypervisor, the hypervisor providing cross-domain communication capability to send the one or more logical block addresses from a filter driver located on the first operating system to a management application backup utility located on the second operating system; and
providing the first operating system and the second operating system access to the data storage device through the hypervisor.

8. The computer program product of claim 7 wherein the one or more data requests results in the first operating system modifying data included in the one or more data storage locations, the method further comprising:
at the second operating system, storing the modified data in a second storage area that is different than the first storage area.

9. The computer program product of claim 7 wherein the method further comprises:
receiving a plurality of data requests from the application;
determining a plurality of logical block addresses, each of the plurality of logical block addresses corresponding to one of the plurality of data requests;
after determining the plurality of logical block addresses, sending the plurality of logical block addresses to the second operating system in a message;
removing, at the second operating system, duplicate logical block addresses included in the plurality of logical block addresses, the removing resulting in a plurality of remaining logical block addresses; and
at the second operating system, performing one or more of the actions using each of the plurality of remaining logical block addresses.

10. The computer program product of claim 7 wherein the method further comprises:
defragmenting the first data storage area using the second operating system; and
in response to the defragmenting, sending logical block address changes from the second operating system to the first operating system, the logical block address changes identifying data locations within the first data storage area resulting from the defragmenting.

11. The computer program product of claim 10 wherein the method further comprises:
- updating, at the first operating system, the file system based upon the logical block address changes received from the second operating system that resulted from the defragmenting.

12. The computer program product of claim 7 wherein the second operating system is located on a different computer system than the first operating system.

13. An information handling system comprising:
- one or more processors;
- a memory accessible by the one or more processors;
- one or more nonvolatile storage devices accessible by the one or more processors; and
- a set of instructions stored in the memory, wherein one or more of the one or more processors executes the set of instructions in order to perform actions of:
  - receiving one or more data requests at a file system from an application, the application and the file system executing on a first operating system;
  - determining one or more logical block addresses that correspond to the one or more data requests, the one or more logical block addresses identifying one or more data storage locations within one of the one or more nonvolatile storage devices;
  - sending the one or more logical block addresses to a second operating system via a filter driver located on the first operating system, the second operating system incompatible with the file system;
  - and at the second operating system, performing one or more actions on the one or more data storage locations that correspond to the one or more logical block addresses received from the first operating system,
  - isolating the first operating system from the second operating system using a hypervisor, the hypervisor providing cross-domain communication capability to send the logical block address from the filter driver located on the first operating system to a management application backup utility located on the second operating system;
  - and providing the first operating system and the second operating system access to the data storage device through the hypervisor.

14. The information handling system of claim 13 wherein the one or more data requests results in the first operating system modifying data included in the one or more data storage locations, and further comprising an additional set of instructions in order to perform actions of:
- at the second operating system, storing the modified data in a different nonvolatile storage device included in the one or more nonvolatile storage devices.

15. The information handling system of claim 13 further comprising an additional set of instructions in order to perform actions of:
- receiving a plurality of data requests from the application;
- determining a plurality of logical data block addresses, each of the plurality of logical data block addresses corresponding to one of the plurality of data requests;
- after determining the plurality of logical block addresses, sending the plurality of logical block addresses to the second operating system in message;
- removing, at the second operating system, duplicate logical block addresses included in the plurality of logical block addresses, the removing resulting in a plurality of remaining logical block addresses; and
- at the second operating system, performing one or more actions using each of the plurality of remaining logical block addresses.

16. The information handling system of claim 13 further comprising an additional set of instructions in order to perform actions of:
- defragmenting the one of the one or more nonvolatile storage devices using the second operating system; and
- in response to the defragmenting, sending logical block address changes from the second operating system to the first operating system, the logical block address changes identifying data location changes within the one of the one or more nonvolatile storage devices resulting from the defragmenting.

17. The information handling system of claim 16 further comprising an additional set of instructions in order to perform actions of:
- updating, at the first operating system, the file system based upon the logical block address changes received from the second operating system that resulted from the defragmenting.

* * * * *